(12) United States Patent
Inaba

(10) Patent No.: US 6,430,373 B1
(45) Date of Patent: Aug. 6, 2002

(54) STEREO CAMERA

(76) Inventor: Minoru Inaba, No. 1116, Oaza Samukawa, Oyama-shi, Tochigi-ken (JP)

( * ) Notice: Subject to any disclaimer, the term of this patent is extended or adjusted under 35 U.S.C. 154(b) by 0 days.

(21) Appl. No.: 09/580,224

(22) Filed: May 26, 2000

(51) Int. Cl.$^7$ .............................................. G03B 35/00
(52) U.S. Cl. ...................................... 396/326; 396/324
(58) Field of Search ................................. 396/324, 326, 396/328, 329; 353/7, 9; 359/466, 468

(56) References Cited

U.S. PATENT DOCUMENTS

| | | | |
|---|---|---|---|
| 1,596,835 A | 8/1926 | Hewson | 396/326 |
| 1,871,281 A | 8/1932 | Savage | 396/326 |
| 2,458,466 A | 1/1949 | Campbell | 396/325 |
| 2,803,179 A | 8/1957 | Donaldson | 396/326 |
| 2,834,270 A | 5/1958 | Williams | |
| 2,851,937 A | 9/1958 | Ziegler et al. | |
| 3,068,772 A | 12/1962 | MacNeille | 396/141 |
| 3,115,816 A | 12/1963 | Muller | 396/327 |
| 3,608,458 A | 9/1971 | Ratliff, Jr. | 95/18 |
| 3,687,031 A | 8/1972 | Jahnsman | 95/11 |
| 3,953,869 A | 4/1976 | Wah Lo et al. | 396/327 |
| 3,967,300 A | 6/1976 | Oshima | 354/288 |
| 4,040,071 A | 8/1977 | Shane | 396/325 |
| 4,249,798 A | 2/1981 | Moskovich | 350/423 |
| 4,418,993 A | 12/1983 | Lipton | 352/57 |
| 4,462,025 A | 7/1984 | Murakami et al. | 340/743 |
| 4,597,659 A | 7/1986 | Suda et al. | 354/409 |
| 4,712,900 A | 12/1987 | Hamano et al. | 396/133 |
| 4,879,596 A | 11/1989 | Miura et al. | 358/88 |
| 5,355,253 A | 10/1994 | Nanjo et al. | 359/473 |
| 5,504,547 A | 4/1996 | Mizukawa | 354/114 |
| 5,548,362 A | 8/1996 | Wah Lo et al. | 396/326 |
| 5,685,626 A | 11/1997 | Inaba | |
| 5,701,532 A | 12/1997 | Inaba | |
| 5,715,489 A | 2/1998 | Inaba | |
| 5,720,538 A | 2/1998 | Inaba | |
| 5,722,751 A | 3/1998 | Inaba | |
| 5,737,655 A | 4/1998 | Inaba | |
| 5,752,211 A | 5/1998 | Morton | |
| 5,778,268 A | 7/1998 | Inaba | |
| 5,879,064 A | 3/1999 | Inaba | |
| 5,892,994 A | 4/1999 | Inaba | |
| 6,253,031 B1 * | 6/2001 | Inaba | 396/326 |

* cited by examiner

*Primary Examiner*—Alan A. Mathews
(74) *Attorney, Agent, or Firm*—Fattibene & Fattibene; Paul A. Fattibene; Arthur T. Fattibene

(57) ABSTRACT

A distance between the optical axes of the photographing lenses of a stereo camera is set to be smaller than the conventional distance between the optical axes so that when the films are mounted on a stereo slide mount being brought closest to each other, the distance Pi∞ between the centers of the subject images at an infinity of the right and left films becomes larger by from 0.7 to 1.2 mm than the distance Pw between the centers of the right and left windows of the stereo slide mount. The films shooting a picture at infinity down to a distance of 2 meters may be mounted on the positions of the smallest distance to obtain a suitable three-dimensional effect, and the distance between the films can be adjusted over a range of from the positions of the smallest distance up to the positions of the largest distance. The range for adjusting the distance is expanded compared to that of the conventional stereo cameras, enabling a subject in a closer range to be shot.

9 Claims, 9 Drawing Sheets

STEREO CAMERA

BACKGROUND OF THE INVENTION

1. Field of the Invention

The present invention relates to a stereo camera and, particularly, to a stereo camera which is capable of shooting a subject in a close range by expanding the offset adjusting range at the time when the films are to be mounted.

2. Description of the Prior Art

FIGS. 6 and 7 are three-dimensional views of a stereo slide. When a distance between the centers of the right and left windows 2R and 2L of a stereo slide mount 1 is denoted by Pw and a distance between the centers of subject images of the right and left films mounted on the stereo slide amount is denoted by Pi, and when Pw=Pi as shown in FIG. 6, then, the subject image and a stereo window Iw (imaginary window in which the right and left windows appears to be in agreement as viewed in a three-dimensional way) appear at infinity.

It is unnatural when the stereo window Iw appears at an infinite position. It is rather natural when the stereo window Iw appears at a distance of several meters and the subject image is seen at the back of the stereo window Iw like when one looks at an outdoor scenery from the indoors through a window of a house.

FIG. 7 illustrates a state where the distance Pi between the centers of the right and left subject images is expanded to be larger than the distance Pw between the centers of the right and left windows, i.e., Pw<Pi, to correct the parallax, where the stereo window Iw appears in a close range and the subject image is seen at a distance. The stereo window Iw appears closer with an increase in the distance Pi between the centers of the subject images.

A manual of stereo photography states that Pw+1.2 mm is a limit of expansion of the distance Pi between the centers of the subject images at infinity and, in this case, the subject images appears at infinity and the stereo window Iw appears at a distance of about 2 to 3 meters though it varies depending upon the focal distance of the photographing lenses, offering a natural three-dimensional feeling. When the distance Pi between the centers of the subject images is more expanded, however, the stereo window Iw appears in a close range, whereby the edges of the stereo window becomes unclear causing strain to the eyes.

There have heretofore been known a stereo camera having a zero lens offset in which the distance between the centers of the right and left photographing lenses is equal to the distance between the centers of the right and left film exposure windows, and a stereo camera of the lens offset-type in which the distance between the centers of the right and left photographing lenses is set to be smaller by about 1.1 mm than the distance between the centers of the right and left film exposure windows in order to correct the distance for setting the stereo window.

When the subject is infinitely distant, the rays of light incident on the right and left photographing lenses from the same point at infinity is in parallel with each other, and the distance between the centers of the subject images at infinity on the right screen and on the left screen on the films becomes equal to the distance between the optical axes of the right and left photographing lenses. When the subject at infinity is shot using the stereo camera having zero lens offset, therefore, the distance between the centers of the right and left infinite subject images on the films of the stereo camera is in agreement with the distance between the centers of the right and left screens.

In mounting the films which have shot the subject at infinity on the stereo slide mount, therefore, the pitch Pf for mounting the right and left films FR, FL must be expanded to be larger than the distance Pw between the centers of the right and left windows 2R, 2L of the stereo slide mount 1 as shown in FIG. 8a, so that the distance Pi between the centers of the subject images becomes larger as denoted by $Pf_{min}$ than the distance Pw between the centers of the right and left windows as shown in FIG. 7. Here, the width of the windows of the stereo slide mount is narrower than the width of the screens of the films FR, FL, and the right and left ends of the films are masked.

Further, as the distance to the subject becomes small, the positions of the subject images on the right and left film exposure surfaces in the stereo camera are displaced outward, respectively, and the distance between the centers of the subject images increases. The images photographed on the films are inverted upside down and right side left. Therefore, the films are mounted on the stereo slide mount being turned by 180 degrees so as to obtain an erect image. As the distance to the subject decreases, therefore, the distance between the centers of the subject images on the stereo slide mount becomes small. Therefore, the films FL, FR that have shot the subject in a close range are mounted being offset outward more than the films that have shot the subject at infinity, and $Pf_{max}$ becomes a limit of the shortest shooting distance as shown in FIG. 8b. The films photographed by using the stereo camera of the lens offset-type of which the pitch of the photographing lenses is contracted by about 1.1 mm from the pitch of the screens, have a contracted distance between the centers of the subject images that are photographed. Therefore, the distance Pi between the centers of the subject images expands in a state where the films are mounted being turned by 180 degrees on the stereo slide mount. Therefore, it is not almost necessary to offset the pitch for mounting the films. If the films are mounted in a manner that the distance Pf between the centers of the screens of the films FR and FL is nearly equal to the distance Pw between the centers of the right and left windows 2R and 2L of the stereo slide mount 1 as shown in FIG. 9a, the distance between the centers of the subject images at infinity is expanded to be larger by about 1.1 mm than the distance Pw between the centers of the right and left windows 2R and 2L, whereby the subject distant by more than about 2 meters appears to be farther than the stereo window Iw as shown in FIG. 7, and this state represents the closest positions $Pf_{min}$ of the films.

When the subject of not farther than 2 meters is shot, however, the right and left films FR and FL must be mounted being offset outward to expand the pitch Pf as shown in FIG. 9b. As shown in FIG. 8b, therefore, the distance between the films can be expanded up to $Pf_{max}$.

As described above, the positions for mounting the films must be adjusted within a range in which the screens of the films are held in the windows of the stereo slide mount, to correct the feeling of distances relative to the stereo window and to the stereo picture. As shown in FIG. 8, however, the films photographed by using the stereo camera having zero lens offset can be adjusted for its distance only within a narrow range ($Pf_{min}$–$Pf_{max}$). In many cases, therefore, the films photographing the subject in a close range are mounted without producing a suitable three-dimensional feeling, though it may differ depending upon the width of the windows of the stereo slide mount.

In the case of the stereo camera of the lens offset-type as shown in FIG. 9, the range for adjusting the distance between the films can be expanded to be wider than that of the case of FIG. 8. Even in this case, however, the films shoting the subject in a close range cannot be coped with.

Thus, there arises a technical assignment that must be solved to expand the range in which the distance between the films can be adjusted on the stereo slide mount and to obtain a proper three-dimensional effect even when shooting a subject in a close range. The object of the invention is to solve the above assignment.

SUMMARY OF THE INVENTION

The present invention was proposed to accomplish the above-mentioned object, and provides a stereo camera wherein the distance between the optical axes of the right and left photographing lenses is set based on the width of the screens of the stereo camera and on the width of windows of the stereo slide mount, so that the distance between the centers of the subject images at infinity on the right and left films becomes equal to the distance between the centers of the right and left windows of the stereo slight mount+(0.7 mm to 1.2 mm) when a pair of right and left films that are shot by using a stereo camera are mounted on a stereo slide mount at the closest positions within a range of adjusting the distance between the films.

BRIEF DESCRIPTION OF THE DRAWINGS

FIG. 1 illustrates a stereo slide mount mounting the films photographed by using a stereo camera of the present invention, wherein

FIG. 8 illustrates a state of mounting the films shot by using a conventional stereo camera of the type of zero lens offset, wherein FIG. 9 illustrates a state of mounting the films shot by using a conventional stereo camera of the lens offset type, wherein

DESCRIPTION OF THE PREFERRED EMBODIMENTS

An embodiment of the invention will now be described in detail with reference to the drawings. First, for easy explanation, described below is a state of mounting the films shot by using the stereo camera of the present invention.

Figure 1A:
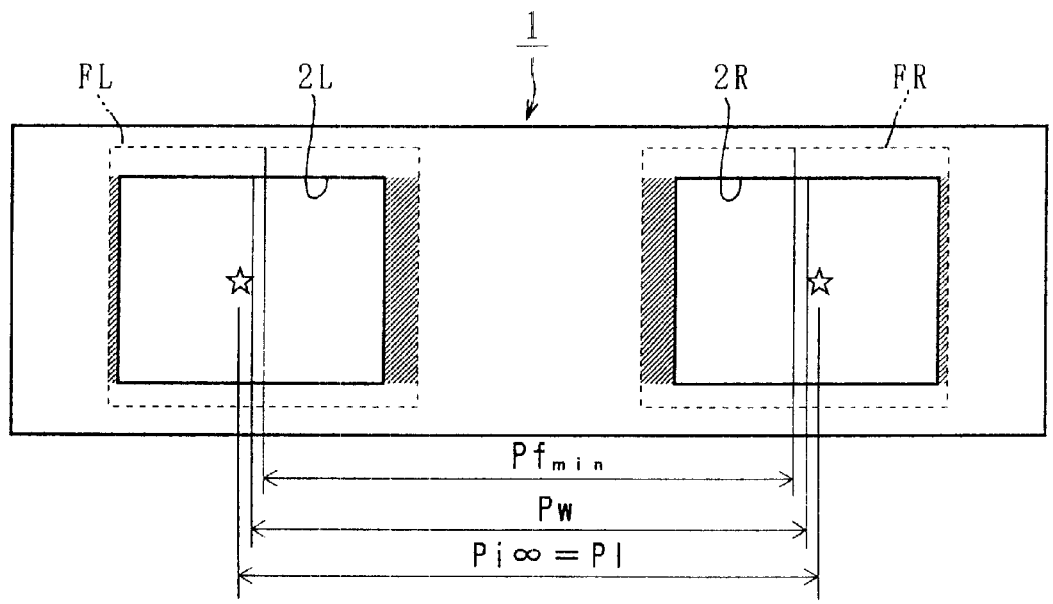
FIG. 1a is a front view showing the positions for mounting the films shooting a subject at infinity.
Figure 1B:
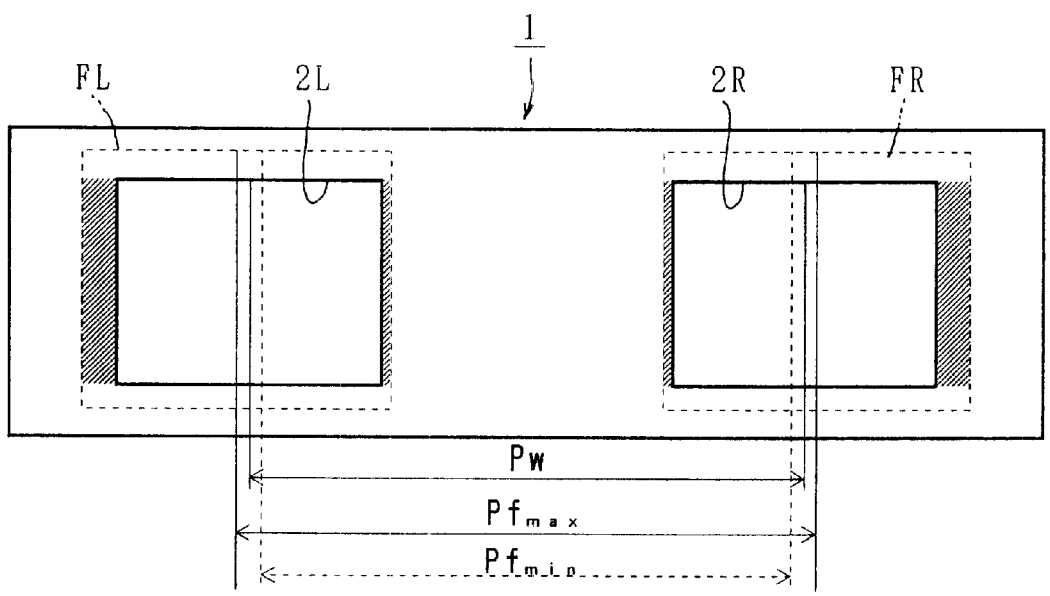
FIG. 1b is a front view showing the positions for mounting the films shooting a subject at the shortest distance.

FIG. 1a shows a stereo slide mount 1 mounting the films FR, FL shooting a subject at infinity, and FIG. 1b shows a stereo slide mount 1 mounting the films FR, FL shooting a subject at the shortest distance.

In FIG. 1a, the right and left films FR and FL are mounted in a state closest to each other ($Pf_{min}$) within a range of adjusting the distance between the films, and the inner sides of the screens are masked. In FIG. 1b, on the other hand, the right and left films FR and FL are mounted in a state of most separated away from each other ($Pf_{max}$) contrary to the case of FIG. 1a, and the outer sides of the screens are masked.

Figure 7:
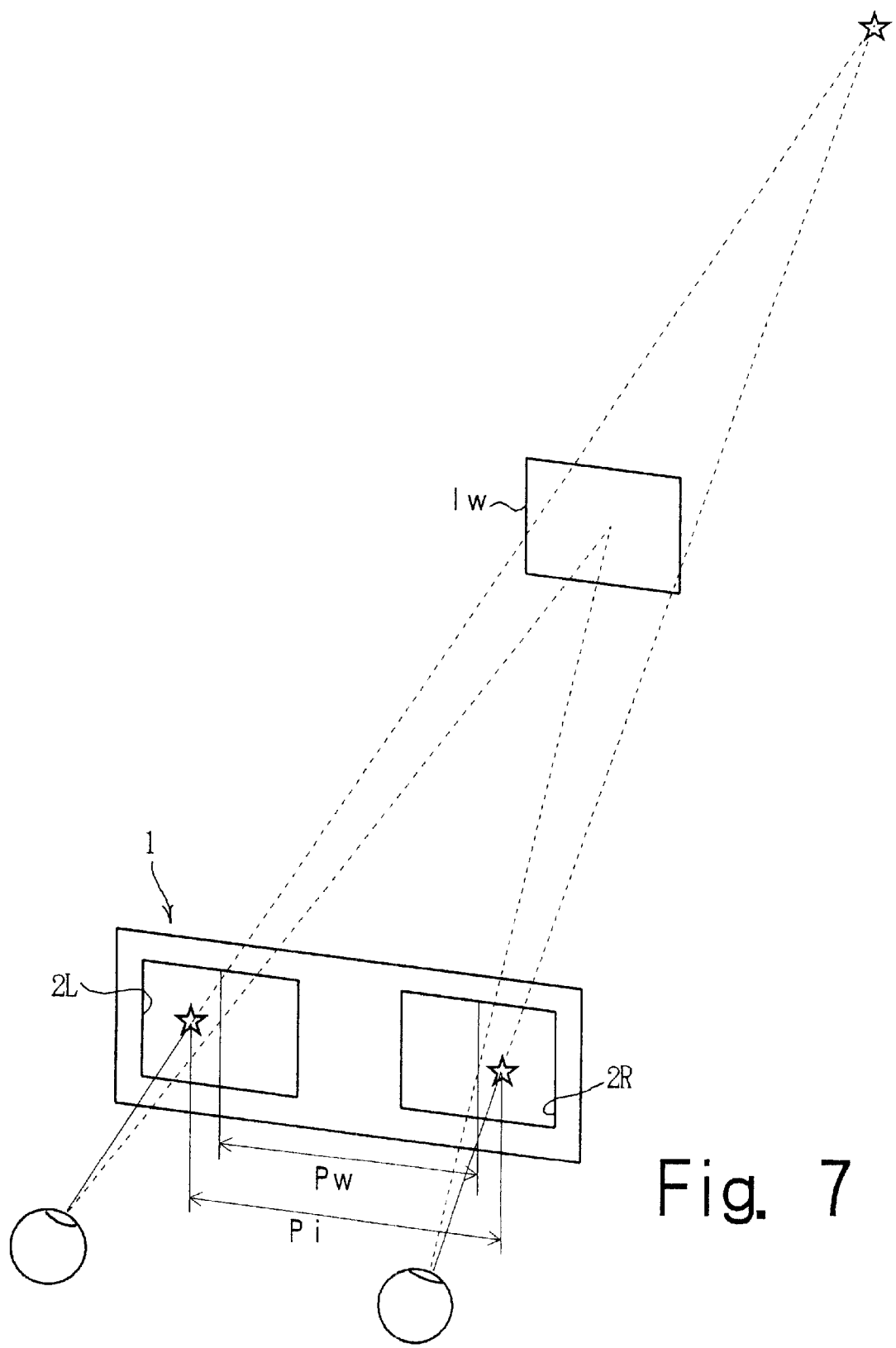
FIG. 7 is a view illustrating a state of forming an erect image on a stereo slide.
Figure 8A:
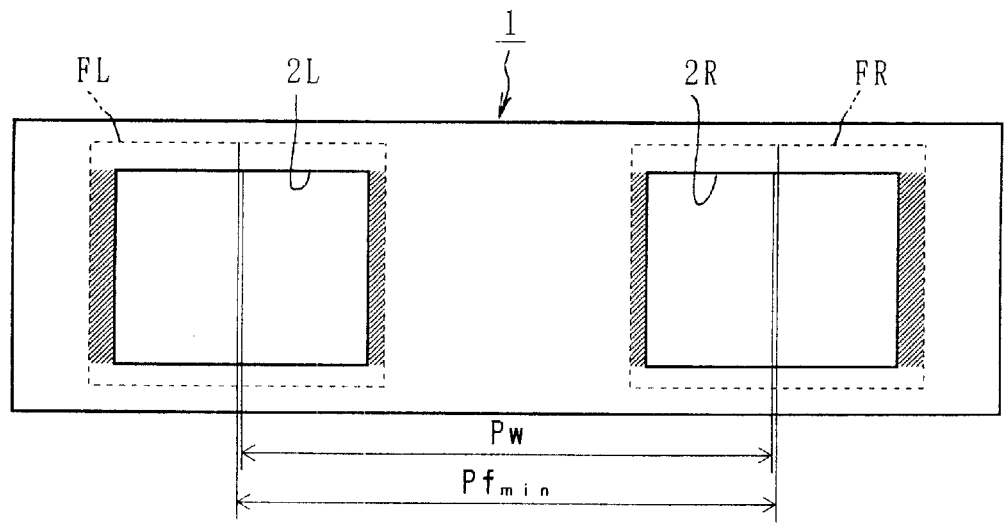
FIG. 8a is a front view illustrating the positions for mounting the films shooting a subject at infinity.
Figure 8B:
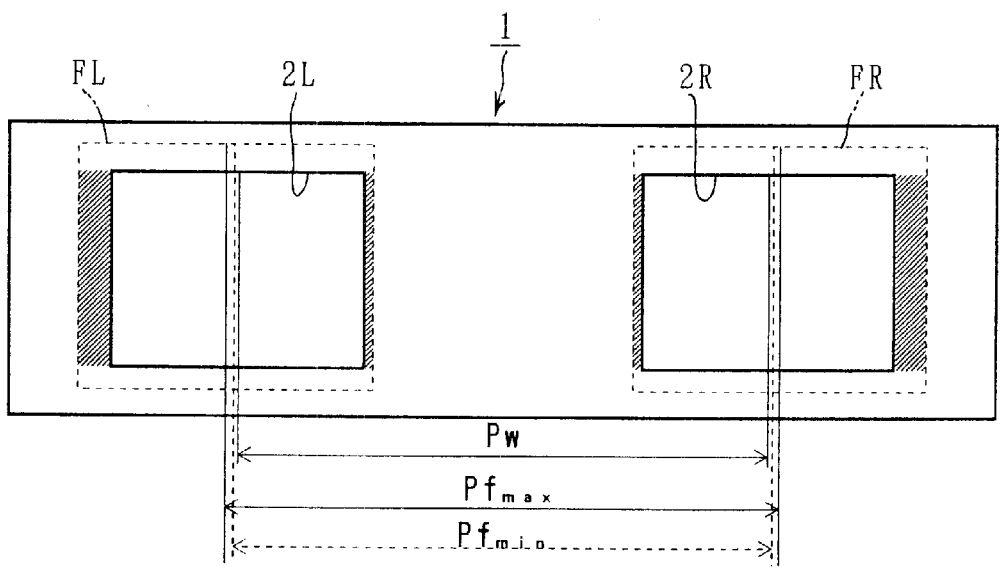
FIG. 8b is a front view illustrating the position for mounting the films shooting a subject at the closest distance.
Figure 9A:
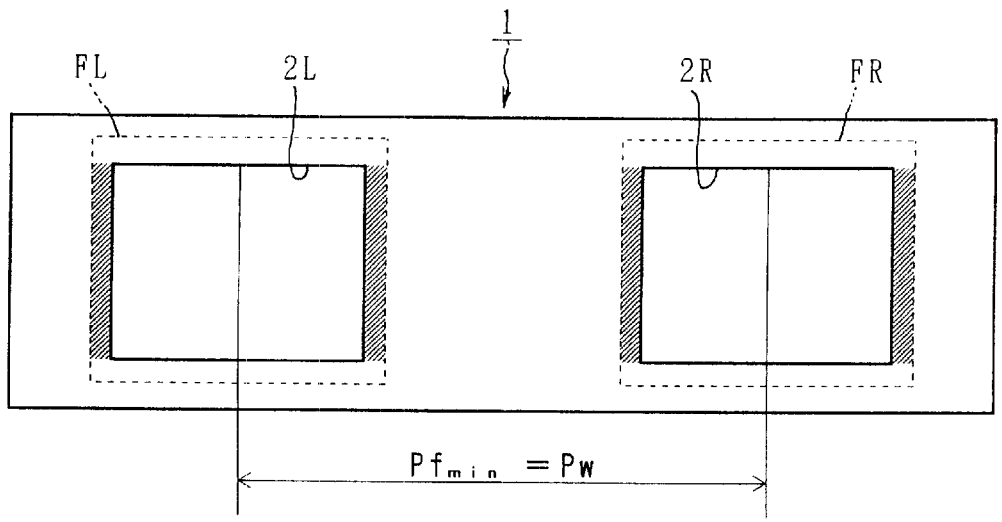
FIG. 9a is a front view illustrating the positions for mounting the films shooting a subject at infinity.
Figure 9B:
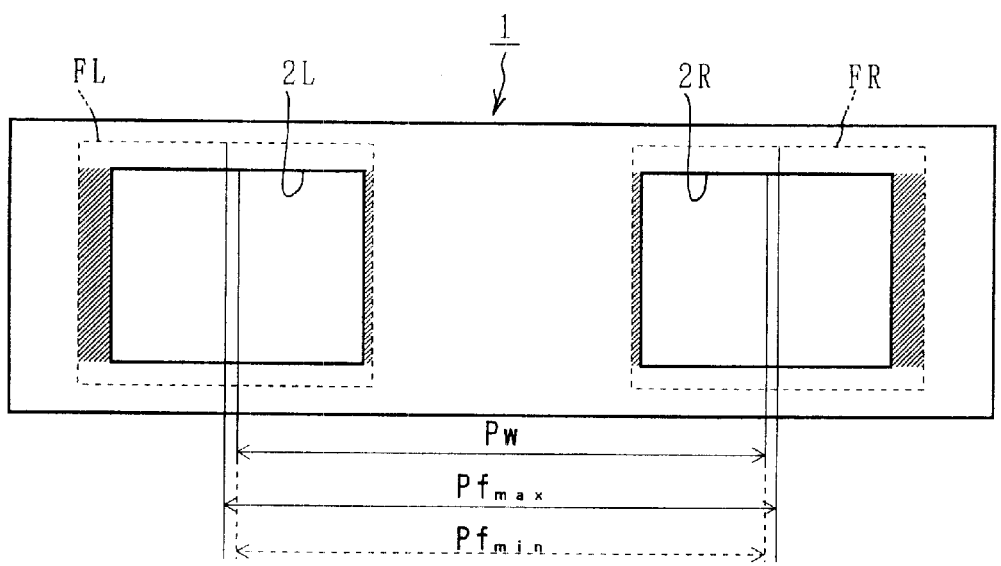
FIG. 9b is a front view illustrating the position for mounting the films shooting a subject at the closest distance.

As described above, the distance between the centers of the subjects at infinity focused on the films in the stereo camera becomes equal to the distance between the optical axes of the right and left photographing lenses. Therefore, when the distance between the optical axes of the stereo camera is so set that the distance Pi between the centers of the subjects at infinity becomes slightly larger than the distance Pw between the centers of the windows 2R and 2L, then, a natural feeling of distance is obtained as shown in FIG. 7, and the distance between the films can be adjusted from a position of minimum distance $Pf_{min}$ up to a position of maximum distance $Pf_{max}$. Thus, according to the stereo camera of the present invention, the range in which the distance between the films can be adjusted is nearly doubled compared to that of the conventional stereo cameras shown in FIGS. 8 and 9.

Figure 2A:
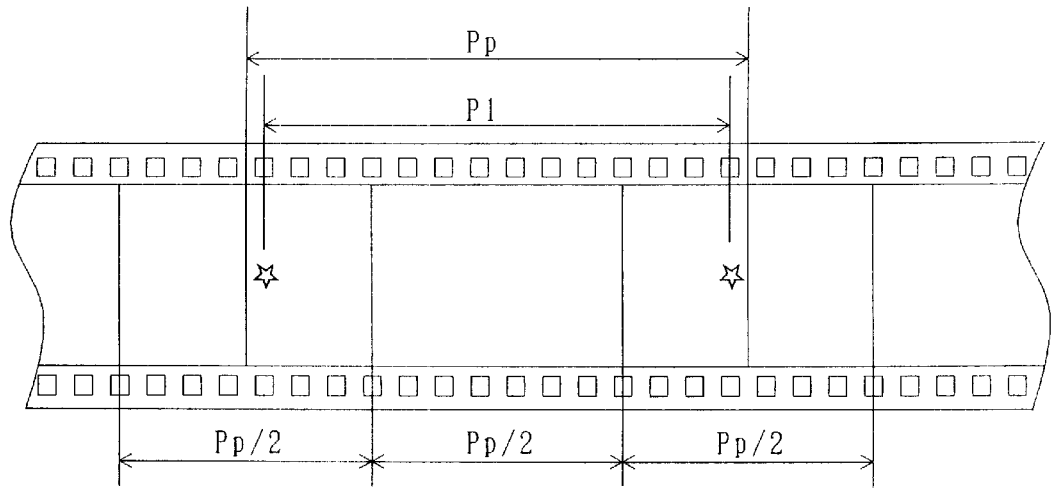
FIGS. 2a and 2b are views illustrating the setting of a distance between the optical axes of the stereo camera of the present invention.
Figure 2B:
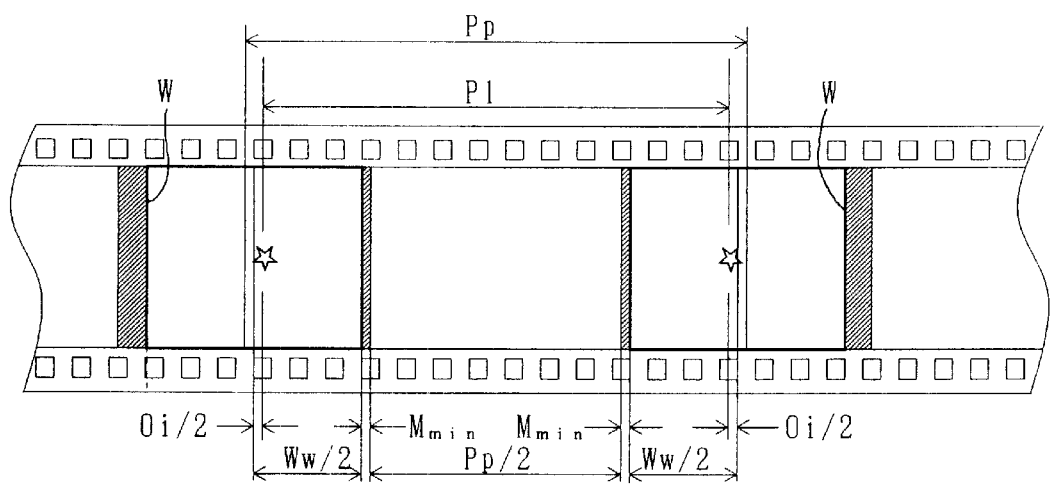

FIG. 2 is a diagram illustrating the distance between the optical axes of the stereo camera of the present invention, and illustrates the arrangement of screens in which a screen of another set is inserted between the right screen and the left screen by using a 135-type film. FIG. 2b shows the windows W of the stereo slide mount superposed on the screens for convenience.

As described earlier, the image photographed by using a camera is an inverted image turned by 180 degrees from the erected state. When the films of the state of the erected image are mounted on the stereo slide mount, therefore, the distance between the right subject image and the left subject image is expanded, whereby the distance P1 between the optical axes of the right and left photographing lenses becomes smaller than the distance Pp between the centers of the right and left screens. Referring to FIG. 2b, if the width of windows of the stereo slide mount is denoted by Ww, a minimum holding allowance of the films that are mounted on the stereo slide mount by $M_{min}$, and the offset amount of the subject at infinity in the windows of the stereo slide mount by Oi, then, $$P1 = Pp/2 + Ww + 2M_{min} - Oi.$$

The minimum holding allowance $M_{min}$ of the films must be determined from the positioning precision of the film-feeding device of the camera and precision for cutting the films. Even when these precisions are very high, a minimum allowance of about 0.3 mm is necessary, though to which only the allowance is in no way limited.

As for the offset amount Oi of the subject at infinity, it would be practical if the stereo window Iw appears at a distance of about 3 meters when the films shooting the subject at infinity are mounted on the stereo slide mount in a state shown in FIG. 1a, and the offset amount will be suitably from 0.7 mm to 0.8 mm. The offset amount may be arbitrarily set within a range of from about 0.7 mm to about 1.2 mm and on which no particular limitation is imposed.

Referring to FIG. 2, the 135-type film has a pitch between perforations of 4.735 mm. Therefore, if a frame of film has a length of 7 perforations, then, The length of the film of a frame (Pp/2)=4.735×7=33.145 (mm), Distance Pp between the centers of the right and left screens=33.145×2=66.29 (mm).

Here, if

Width Ww of the windows of the stereo slide mount=30.5 mm,

Minimum holding allowance $M_{min}$ of the film=0.3 mm,

Offset amount 0i of the subject at infinity=0.75 mm, then, the distance P1 between the optical axes of the photographing lenses is P1=Pp/2+Ww+2$M_{min}$−0i, and hence, 66.29/2+30.5+0.6−0.75=63.495(mm)

which is nearly equal to 63.5 mm which is a worldwide standard value of the distance between the right and left human eyes.

When the films shooting the subject at infinity using the stereo camera are mounted on the stereo slide mount, the distance to the stereo window Iw becomes the distance P1 between the optical axes of the photographing lenses/offset amount 0i of the subject at infinity×focal distance f. When the films shooting the subject at infinity using the stereo camera having a distance P1 between the optical axes of 63.495 mm, an offset amount 0i of 0.75 mm and a focal distance f of 36 mm, are mounted on the stereo slide mount, then, 63.495/0.75×36=3047.76 (mm)

and the stereo window Iw appears at a distance of about 3 meters.

When the pair of right and left films are mounted on the stereo slide mount having the distance between the centers of right and left windows of 62 mm to 62.5 mm, the pair of right and let films being brought closest to each other so that the film holding allowance of the outer sides is 0.3 mm, then, the distance between the centers of the subject images at infinity becomes, (62+0.75) to (62.5+0.75)=62.75 to 63.25 (mm)

This value is slightly smaller than 63.495 mm which is the distance between the optical axes of the photographing lenses. However, there is quite no problem since the three-dimensional feeling at the time of appreciation is determined by a relative relationship between the stereo window and the feeling of distance to the subject image.

A minimum holding allowance $M_{min}$ of the films does not appear in the windows of the stereo slide mount and, hence, a generally employed constitution may be used in which an unexposed gap is formed between the screens on the films. However, it is offensive to see a black gap that appears in the windows. Besides, in order to increase the offset adjusting range as wide as possible, it is desired to employ a gapless system in which the screens are continuing on the films without gap as shown in FIG. 2.

Compared below are the shortest photographing distance (photographing distance at which the distance between the centers of the subject images becomes in agreement with the distance between the centers of the right and left windows in the state of FIG. 1b, and the subject and the stereo window appears at an equal distance) of the stereo camera of the invention and the shortest photographing distance (state of FIG. 9b) of the conventional stereo camera of the lens offset-type.

In both the conventional stereo camera and the stereo camera of the invention,

Distance Pp between the centers of the right and left exposed screens=66.29 mm,

Length Pp/2 of a frame of film=33.145 mm, and

Width Ww of the windows of the stereo slide mount=30.5 mm,

Minimum holding allowance $M_{min}$ of the films=0.3 mm

The offset amount of the distance between the optical axes of the photographing lenses of the conventional stereo camera of the lens offset-type is not larger than −1.2 mm. Therefore, a minimum limit of the distance P1 between the optical axes is 66.29−1.2=65.09 mm.

Further, the width Eo for adjusting the distance between the films is, (length of a frame of film−width of window−2(minimum holding allowance of film))/2 and, hence, (33.145−30.5−2(0.3))/2=1.0225 (mm)

Figure 3:
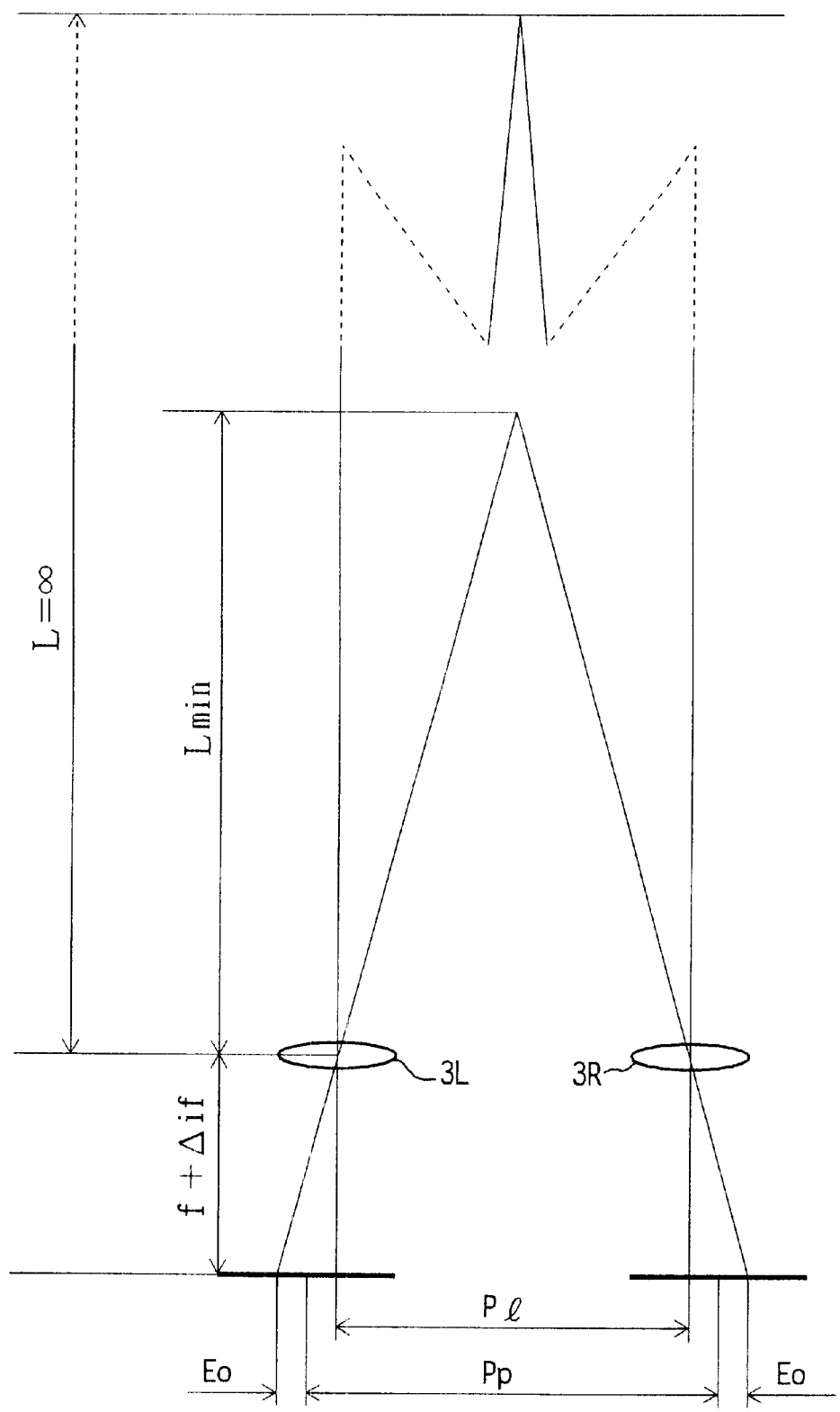
FIG. 3 is a diagram illustrating a relationship between offset amount of the picture and the distance across the optical axes of the photographing lenses of the stereo camera.

In FIG. 3, the projection ratio r of the photographing lenses 3R and 3L is (distance Pp between the centers of the right and left screens−distance P1 between the optical axes+2 (width Eo for adjusting the distance between the films))/distance P1 between the optical axes and, hence, Projection ratio r=(66.29−65.09+2×1.0225)/65.09=0.049854

The distance (focal distance=f+Δif) from the principal points of the photographing lenses 3R, 3L to the surfaces of the films is equal to focal distance+focal distance ×projection ratio. Therefore, when the photographing lens has a focal distance of 36 mm, then the focal distance is, 36+36×0.049854=37.7947 (mm)

The distance from the principal points of the photographing lenses 3R, 3L to the subject is found from the focal distance (f+Δif)/projection ratio r, i.e., 37.7947/0.049854=758 (mm).

In the case of the conventional stereo camera, the subject at a shooting distance of 758 mm and the stereo window appear at an equal distance when the films are mounted on the stereo slide mount at positions most separated away from each other. In the conventional stereo camera, therefore, proper three-dimensional feeling is obtained when the shooting distance lies from 758 mm through up to infinity.

According to the stereo camera of the present invention, on the other hand, the distance between the optical axes of the right and left photographing lenses is 63.495 mm as described earlier, which is smaller than the distance between the optical axes of the conventional stereo camera, and the width Eo for offset adjustment at the time of mounting the films on the stereo slide mount is 2.045 mm which is twice as great as that of the conventional stereo camera. Accordingly, the projection ratio r becomes, (66.29−63.495+2×2.045)/63.495=0.1084337 and, hence, the focal distance (f+Δif) becomes,

36+36×0.1084337=39.9036 (mm)

Therefore, the distance L from the principal points of the photographing lenses to the subject becomes, 39.9036/0.1084337=368 (mm)

making it possible to shoot pictures from a range of about 368 mm which is about one-half the shortest shooting distance 758 mm of the conventional stereo camera through up to infinity.

When the shooting in a close range is not required, the films may be mounted on the stereo slide mount that has a width of windows increased to be larger than that of the conventional stereo slide mount to decrease the screen-masking amount down to one-half. In this case, the range for adjusting the distance between the films is nearly the same as that with the conventional stereo camera but the loss of screens can be halved.

Further, in a stereo camera of such a screen arrangement that two other frames of screens are sandwiched between the right and left exposure screens, the length of a frame of film may be found by dividing the distance Pp between the centers of the right and left screens by three, and, the distance P1 between the optical axes of the photographing lenses is found from, Distance $P1$ between the optical axes=(distance $Pp$ between the centers of the right and left screens/3)+width $Ww$ of the window of the stereo slide mount+$2M_{min}$-$0i$ A reversal film that is developed exhibits black color at the unexposed portions, and the screens taking a picture of night scenes or dark background may often be cut at incorrect positions. Besides, the films may often be mounted in incorrect combinations or right side left. By providing the stereo camera with a device that exposes the films to light bearing frame numbers as a device for marking the films with an index for cutting, however, the mounting operation can be greatly facilitated.

Figure 4:
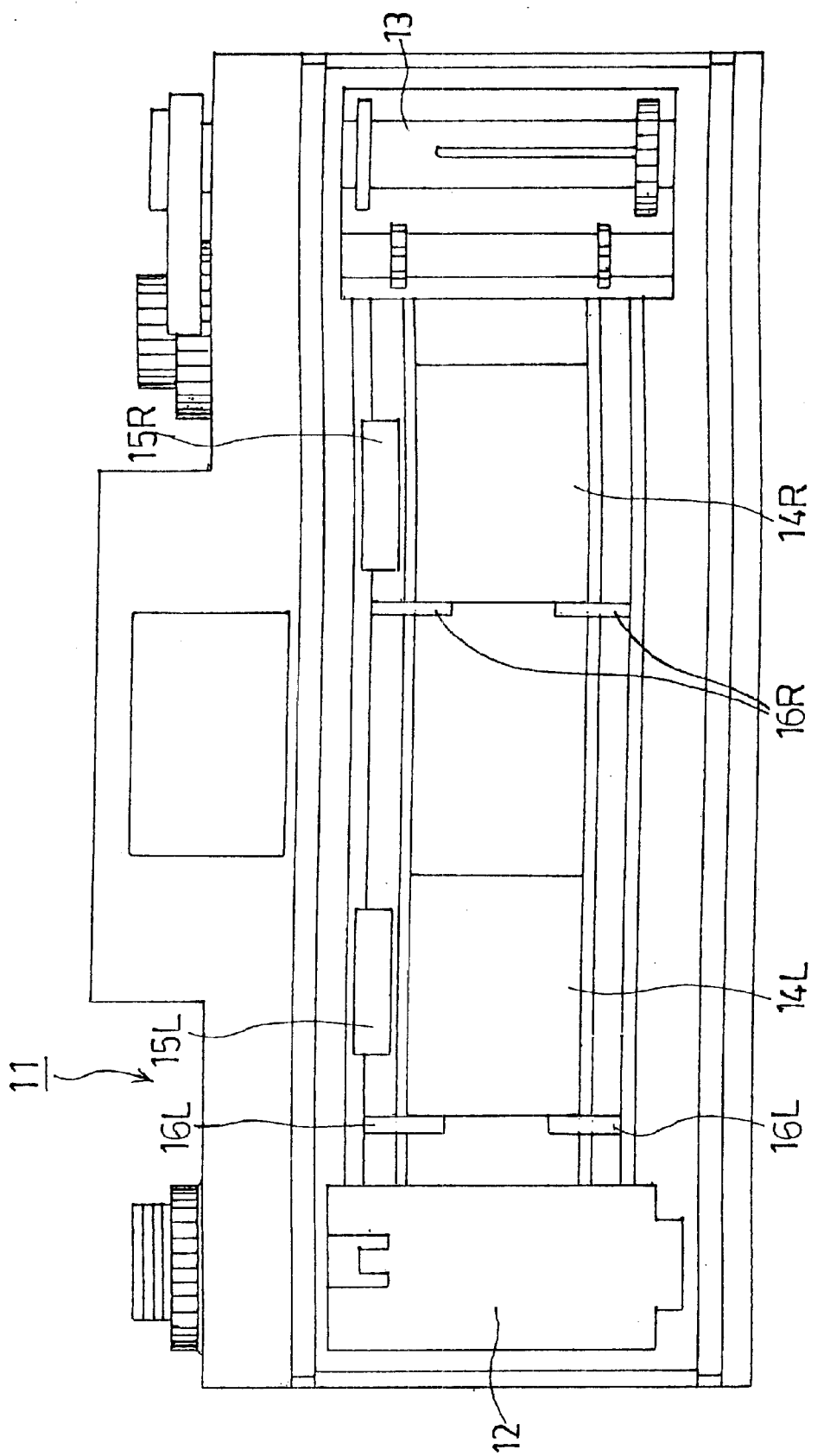
FIG. 4 is a back view of a state of when a back closure of the stereo camera is opened.

FIG. 4 illustrates a state where the back closure is removed from the stereo camera 11. Like a general camera, a Patrone-loading chamber 12 at the left end of the body is loaded with the 135-type film, an end of the 135-type film is anchored to a film-winding shaft 13 at the right end, and the film is wound on the film-winding shaft 13. A pair of right and left exposure windows 14R and 14L are formed between the Patrone-loading chamber 12 and the film-winding shaft 13.

Number-exposing devices 15R and 15L are provided above the exposure windows 14R and 14L to expose the films to light bearing frame numbers and right/left discrimination characters on the areas outside the screens of the films. Further, index-exposing devices 16R and 16L are provided at the left sides of the exposure windows 14R and 14L, respectively, to expose the film to light bearing a vertical line that serves as a target of cutting among the screens.

The exposing devices 15 and 16 employ LEDs that emit light being interlocked to the shutter to expose the films to light bearing lines and characters. They may be provided on the back closure of the stereo camera like a general date-recording device, to expose the films to light on the back surfaces thereof.

Figure 5:
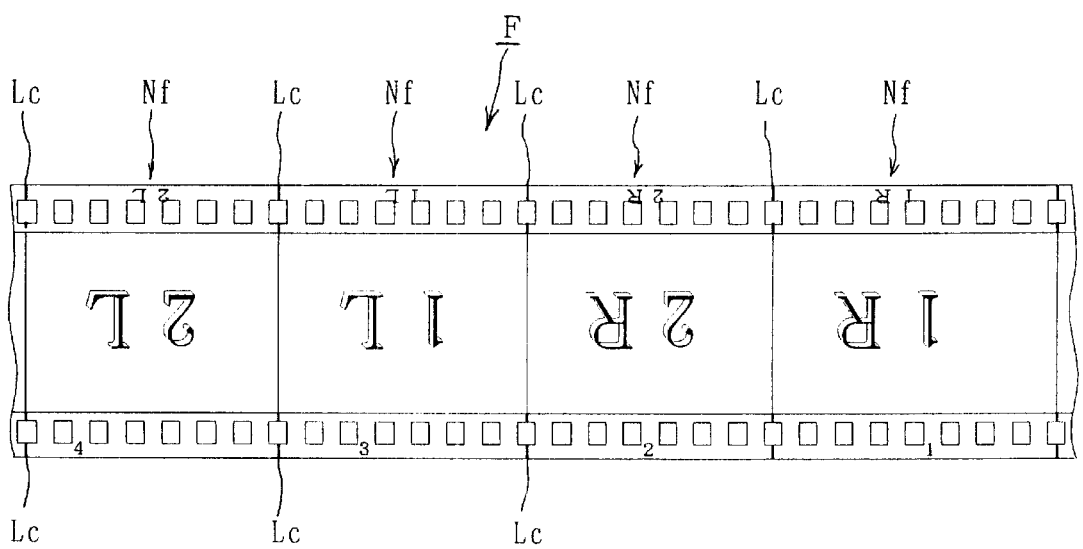
FIG. 5 is a front view of film strips shot by using the stereo camera of FIG. 4.
Figure 6:
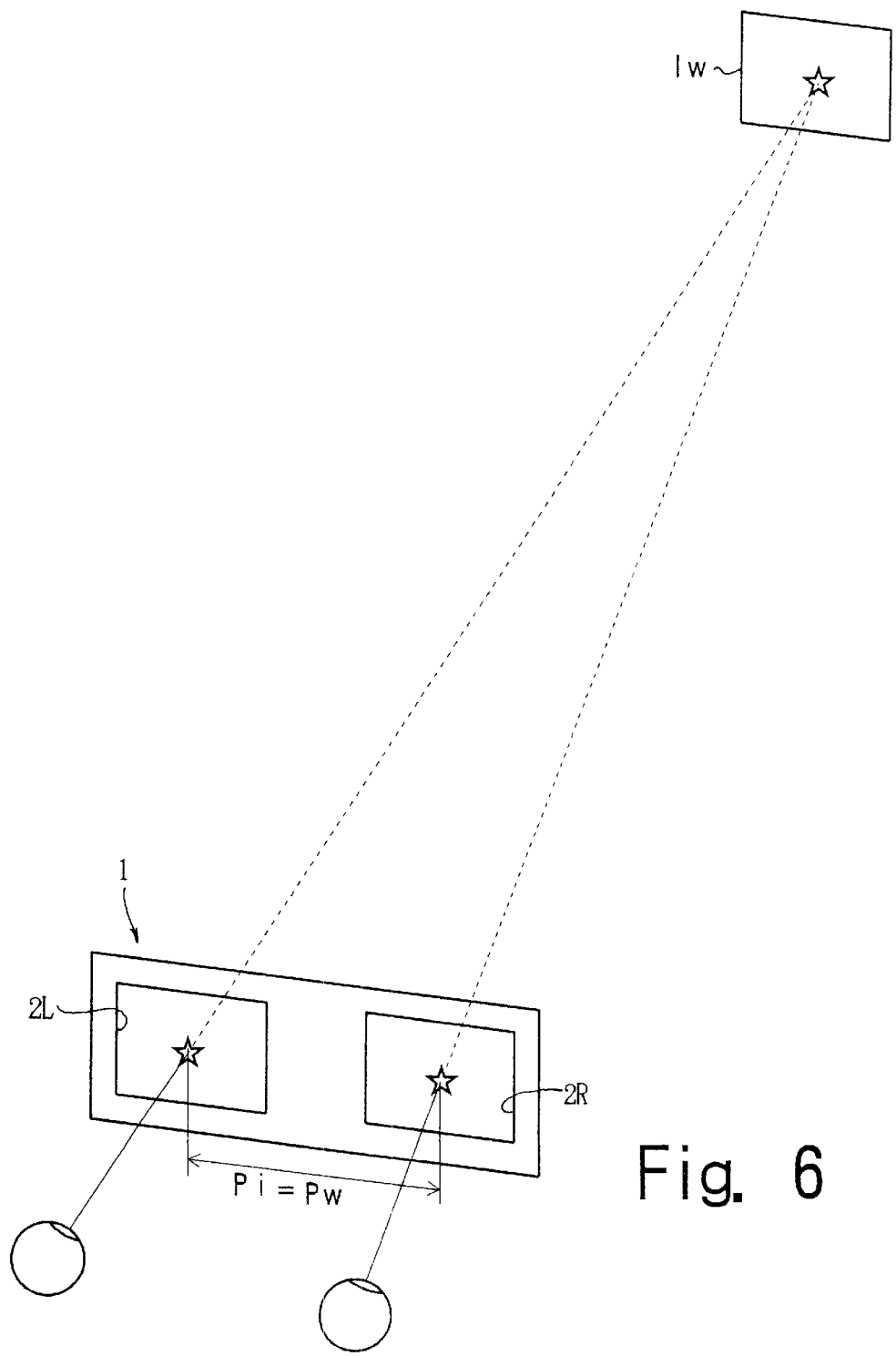
FIG. 6 is a view illustrating a state of forming an erect image on a stereo slide.

FIG. 5 shows film strips F photographed by using the stereo camera 11, wherein frame numbers Nf are recorded on the edge portions on the upper side of the screens in order of 1R, 2R, 1L, 2L, - - -, and indexes Lc for cutting the film are recorded among the screens on the film.

According to the stereo camera of the present invention as described above, the distance between the optical axes of the photographing lenses is so set that the width for adjusting the distance between the films is nearly doubled compared to that of the conventional stereo camera when the photographed films are to be mounted on the stereo slide mount. Therefore, the films that have shot a picture in a close range, for which the parallax could not be corrected to a sufficient degree due to limitation in the width for adjusting the distance between the films, can now be mounted maintaining a suitable distance expanding the limitation imposed on the shortest distance of shooting.

The invention is in no way limited to the above-mentioned embodiment only but can be modified in a variety of other ways without departing from the technical scope of the invention, and such modified embodiments, too, are encompassed by the scope of the present invention, as a matter of course.

I claim:

1. A stereo camera comprising:
   a right photographing lens with a right optical axis and a left photographing lens with a left optical axis, the right and left optical axes separated by a lens distance; and
   a right exposure screen and a left exposure screen formed within said stereo camera, each of said right and left exposure screens each having an exposure screen width and center, the exposure screen centers of said right and left exposure screens separated by an exposure screen distance,
   wherein the lens distance of said right and left photographing lenses is set based on the exposure screen width of said right and left exposure screens of the stereo camera and on a width of windows of a stereo slide mount, so that the distance between centers of subject images at infinity on right and left films becomes equal to a distance between centers of right and left windows of the stereo slide mount plus a distance within a range between 0.7 mm to 1.2 mm when the right and left films that are shot by using the stereo camera are mounted on the stereo slide mount at a closest position within a range of adjusting a distance between the right and left films.

2. A stereo camera according to claim 1, wherein index-exposing devices are provided to record indexes of vertical lines that serve as targets for cutting among the neighboring screens of the film in the stereo camera.

3. A stereo camera according to claim 1, wherein number-exposing devices are provided to expose the film in the stereo camera to light bearing frame numbers and right screen/left screen discrimination characters on the areas over or under the screens on the film.

4. A stereo camera and stereo slide mount system comprising:
   a stereo camera having a right photographing lens with a right optical axis and a left photographing lens with a left optical axis, the right and left optical axes separated by a lens distance;
   a right exposure window and a left exposure window formed within said stereo camera, each of said right and left exposure windows each having an exposure window width and center, the exposure window of said right and left exposure windows separated by an exposure window distance;
   a stereo slide mount, said stereo slide mount having an offset adjustment range capable of mounting a right and left film for forming a stereo slide within the offset adjustment range;
   a right stereo slide mount window and a left stereo slide mount window formed within said stereo slide mount, each of said right and left stereo slide mount windows having a mount window width and a mount window center, the mount window centers of said right and left stereo slide mount windows separated by a mount window distance; and wherein the lens distance of the right and left photographing lenses is set based on the exposure window width of said right and left exposure windows of the stereo camera and on the mount window width of said stereo slide mount, so that the distance between centers of subject images at infinity on the right and left films becomes equal to the mount window distance of the stereo slide mount plus a distance within a range between 0.7 mm to 1.2 mm when the right and left films that are shot by using the stereo camera are mounted on said stereo slide mount at a closest position within the offset adjustment range for adjusting a distance between the right and left films, whereby the stereo camera is capable of shooting pictures on film for mounting in said stereo slide mount with a shorter shooting distance while maintaining a suitable three-dimensional feeling upon viewing.

5. A stereo camera and stereo slide mount system as in claim 4 further comprising:

an index-exposing device formed in said stereo camera, whereby indexes of vertical lines that serve as targets for cutting among the neighboring screens of film are capable of being formed.

6. A stereo camera and stereo slide mount system as in claim 4 further comprising:

a discrimination character-exposing device formed in said stereo camera, whereby discriminating characters are capable of being formed on a film.

7. A stereo cam era and stereo slide mount system comprising:

a stereo camera having a right photographing lens with a right optical axis and a left photographing lens with a left optical axis, the right and left optical axes separated by a lens distance;

a right exposure window and a left exposure window formed within said stereo camera, each of said right and left exposure windows each having an exposure window center, the exposure window center of said right and left exposure windows separated by an exposure window distance;

a stereo slide mount, said stereo slide mount having an offset adjustment range of mounting film for forming a stereo slide;

a right stereo slide mount window and a left stereo slide mount window formed within said stereo slide mount, each of said right and left stereo slide mount windows having a mount window width and a stereo slide mount center, the stereo slide mount centers of said right and left stereo slide mount windows separated by a mount window distance; and wherein the lens distance is set by, $$P1 = Pp/2 + Ww + 2M\min - 0i,$$

where,

P1 is equal to the lens distance,

Pp is equal to the exposure window distance,

Ww is equal to the mount window width,

Mmin about 0.3 mm, and 0i is between 0.7 mm and 1.2 mm, whereby the offset adjustment range is capable of being increased and the stereo camera is capable of shooting pictures on film for mounting in said stereo slide mount with a shorter shooting distance while maintaining a suitable three-dimensional feeling upon viewing.

8. A stereo camera and stereo slide mount system as in claim 7 further comprising:

an index-exposing device formed in said stereo camera, whereby indexes of vertical lines that serve as targets for cutting among the neighboring screens of film are capable of being formed.

9. A stereo camera and stereo slide mount system as in claim 7 further comprising:

a discrimination character-exposing device formed in said stereo camera, whereby discriminating characters are capable of being formed on a film.

* * * * *